(12) United States Patent
Papafotiou et al.

(10) Patent No.: US 6,371,709 B1
(45) Date of Patent: Apr. 16, 2002

(54) SCREWS AND THREADFORMS

(75) Inventors: Fotios Papafotiou, East Brighton; David Ian Kershaw, Lara, both of (AU)

(73) Assignees: Hanstock Fasteners Pty Limited, Sydney; Reid Construction Systems Pty Limited, Melbourne, both of (AU)

( * ) Notice: Subject to any disclaimer, the term of this patent is extended or adjusted under 35 U.S.C. 154(b) by 0 days.

(21) Appl. No.: 09/697,085

(22) Filed: Oct. 27, 2000

Related U.S. Application Data

(63) Continuation of application No. 09/341,296, filed on Oct. 4, 1999, now abandoned.

(30) Foreign Application Priority Data

| Nov. 10, 1997 | (AU) | ............................................. PP0264 |
| Nov. 10, 1997 | (AU) | ............................................. PP0265 |
| Jun. 26, 1998 | (AU) | ............................................. PP4362 |

(51) Int. Cl.⁷ ........................... F16B 35/04; F16B 39/30
(52) U.S. Cl. ...................... 411/412; 411/311; 238/372; 470/10
(58) Field of Search ................... 411/309, 310, 411/311, 411, 412, 413; 238/372; 470/10

(56) References Cited

U.S. PATENT DOCUMENTS

| 408,531 A | * 8/1889 | Rogers ....................... 411/412 |
| 422,307 A | 2/1890 | Libbey |
| 2,788,046 A | 4/1957 | Rosan |
| 3,207,023 A | 9/1965 | Knohl |
| 3,813,718 A | 6/1974 | Kamiya |
| 4,144,795 A | 3/1979 | Gitshall |
| 4,764,067 A | 8/1988 | Kawashima |
| 5,531,553 A | 7/1996 | Bickford |

FOREIGN PATENT DOCUMENTS

| DE | 25 50817 A | 5/1976 |
| GB | 548516 | 10/1942 |

OTHER PUBLICATIONS

Derwent Abstract 96–504109/50.

* cited by examiner

Primary Examiner—Neill Wilson
(74) Attorney, Agent, or Firm—Arent Fox Kintner Plotkin & Kahn, PLLC

(57) ABSTRACT

A screw thread having a threadform including a ridge rising from root to crest with the crest having two peaks, separated by a trough the depth of which is less than the height of the ridge from root to crest. It has particular use as a screw for timber, and is especially suited to fixing railway rails to sleepers.

14 Claims, 4 Drawing Sheets

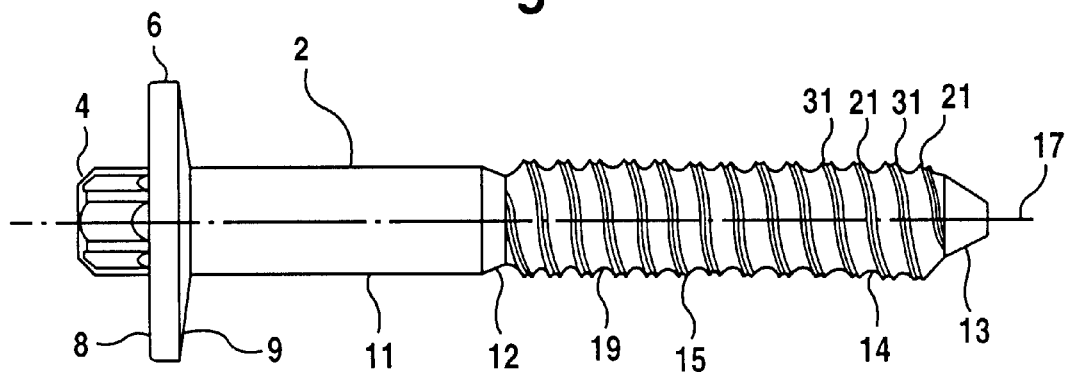
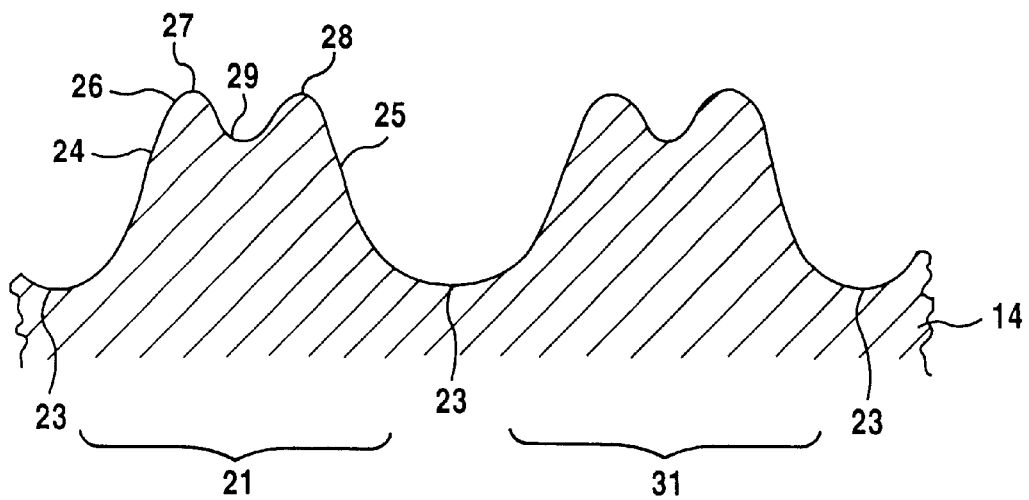

SCREWS AND THREADFORMS

This application is a continuation of Ser. No. 09/341,296, filed Oct. 4, 1999 and now abandoned.

BACKGROUND

This invention concerns the construction of threads for screw fasteners, particularly those for screwing into timber, and has particular application to fasteners for attaching railway track to timber sleepers.

Many forms of screws have been proposed and used for holding railway track to timber sleepers. They have been used with new sleepers and for insertion into holes previously created by spike fasteners, where the holes had enlarged to the point where the spikes were loose, or for so-called spike killed sleepers where no-further sound timber was available on a sleeper to drive in a further spike.

It has now been found that a screwed fastening with the novel thread characteristics described hereunder has significant advantages during installation and in track operation performance compared with existing alternatives. Although developed particularly for rail track application, the thread has much wider applications.

SUMMARY OF THE INVENTION

In one aspect the present invention provides a screw thread having a threadform comprising a ridge rising from root to crest with the crest having two peaks separated by a trough the depth of which is less than the height of the ridge from root to crest. Preferably the trough depth is between 10% and 40% of the ridge height, more preferably between 15% and 35%.

In another aspect the invention provides a screw thread having a twin start helical thread configuration consisting of two ridges helically winding around a shank, each of the ridges having flanks rising from a root to a crest, and at least one of the crests having a pair of peaks. The crests of both of the helically wound ridges may have a pair of peaks. One of the ridges may be higher than the other ridge. Preferably the lower ridge is between 30% and 70% of the height of the higher ridge.

In another aspect the invention provides a twin start screw thread for a fastener, the thread having a repeated treadform profile comprising:

a first crest, having a first pair of peaks, rising from a first root and falling to a second root, and a second crest, having a second pair of peaks, rising from the second root and falling to the first root.

The first crest may be higher than the second crest. Preferably the second crest is between 30% and 70% of the height of the first crest.

In another aspect the invention provides a screw fastener for securing a railway track rail to a timber sleeper, the fastener having a thread as described above.

In a further aspect the invention provides a method of rolling a helical screw thread onto a cylindrical shank of a metal workpiece comprising:

rolling into the shank initial helical grooves by plastically deforming the metal into a hump immediately to either side of the grooves, subsequently deepening and widening the initial grooves by fixer rolling which increases the size of the humps and displaces the humps increasingly further from the initial grooves, further deepening and/or widening the grooves to press the two humps between adjacent grooves into each other until they produce a single ridge with a crest carrying a pair of peaks, and finish rolling the crest to more uniformly define the two peaks along the crest of the ridge.

Preferably the height of each pair of peaks, when measured from a trough between aid pair, is between 10% and 40% of the height of their respective ridge. More preferably it is between 15% and 30% of the height of the ridge.

Preferably:

the screw thread has a twin start with said two initial helical grooves axially offset from each other by less than 45% (160°) of their lead, the finished thread has the helical crests of the ridges offset by substantially 50% (180°) of their leads, and as one helical groove is displaced axially relative to the other helical groove during the rolling process, one helical ridge is produced which is taller than the other.

More preferably the axial offset is between 20% (70°) and 35% (125°) of the thread lead.

In a further aspect the invention provides a screw fastener for securing a railway track rail to a timber sleeper, the fastener having a thread as described above. Preferably the fastener has a head for applying torque to the fastener and a collar integrally formed with the head, the collar having a sloping face facing the thread, said slope matching that of the upper surface of the foot of the rail.

The invention will now be described with reference to the attached drawings which illustrate particular embodiments of the invention.

BRIEF DESCRIPTION OF THE DRAWINGS

FIG. 1 is an illustration showing a rail fastening screw carrying a thread according to one embodiment of the present invention.

FIG. 2 is a diagram showing in detail the threadform on the screw shown in FIG. 1.

DETAILED DESCRIPTION OF THE DISCLOSED EMBODIMENTS

Figure 3:
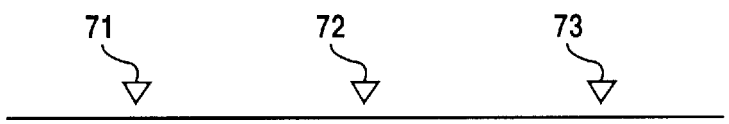
FIGS. 3 to 7 diagrammatically steps in a thread rolling process which produces the threadform shown in FIG. 2.

Referring to FIG. 1, the rail fastening screw 2 has a head 4, flange 6, plain shank 11, tapered shoulder 12 and tip 13. Between the shoulder 12 and tip 13 the screw has a portion into which a thread 15 is rolled.

For the embodiment shown, the screw has the following approximate dimensions:

| | |
|---|---|
| total length = | 125 mm |
| diameter of shank 11 = | 16 mm |
| pre-roll diameter for thread 15 = | 14.5 mm |
| diameter of flange 6 = | 40 mm |
| head = | 18 mm diameter 6-lobe head |

The flange 6 is tapered, with its top face 8 perpendicular to the major axis 17 of the screw and its bottom face 9 angled at about 11.5° to the top face. This taper is to conform with the corresponding taper on the foot of railway rails which the bottom face 9 bears against in use. The screws may be used to affix a rail with or without the use of a tie plate between the rail and sleeper.

The thread 15 has a 5 mm pitch and 10 mm lead. Accordingly it is a twin start thread with two ridges 21 and 31 of equal height helically winding around a core 19. The thread is continuous for its length on the screw. The crest of each ridge 21 and 31 carries a pair of peaks along its length and these will now be described.

With reference to FIG. 2, the threadform is indicated as the solid line in the illustration. It should be noted that the cross section through the thread so illustrated is not parallel to the axis 17 of the screw, but is instead at the helix angle to the axis 17 in order to be at right angles to the line of the ridges 21 and 31. The illustration shows the twin start thread consisting of identical of ridges 21 and 31 respectively separated by roots 23 where the thread rolling process has pressed most deeply into the metal of the shank 14. The distance of the roots 23 from the axis 17 defines the radius of the core 19 of the threaded shank 14.

Working from the left side of FIG. 2, the threadform profile rises from a root 23 to the ridge 21 by way of a flank 24 which rises to a crest 26. This crest carries two peaks 27 and 28 with a trough 29 between them. From peak 28 the ridge falls down a flank 25 to the root 23 which is of the same depth as the root on the other side of the ridge 21. The threadform then repeat its sequence for ridge 31. Ridges 21 and 31 are the two ridges which form the twin start thread.

FIG. 3 illustrates diagrammatically the positioning of initial tips 71 to 73 of contact upon a cylindrical workpiece by a die in a thread rolling operation which is to produce a twin start thread with evenly spaced, evenly sized ridges in the threadform. The tips 71 to 73 are evenly spaced along the workpiece. Another way of expressing this is to say the helical grooves the tips would produce are offset from each other by 180° or 50% of their lead.

Figure 4:
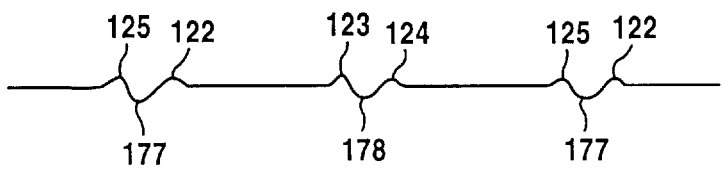

Referring to FIG. 4, when the tips 71 to 73 are rolled into the surface of the workpiece, two helical grooves 177 and 178 are produced. The thread rolling die is configured so that the groove 77 made by tip 71 is contiguous with the groove made by tip 73. Grooves 177 and 178 are evenly spaced along the workpiece.

Figure 5:
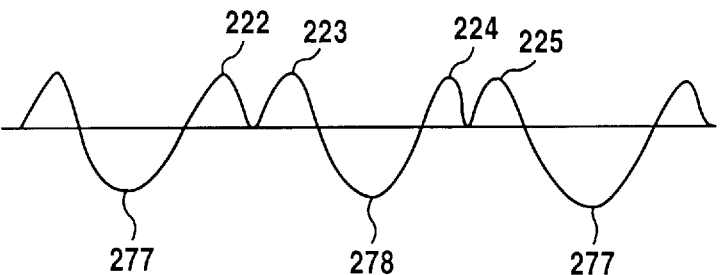
Figure 6:
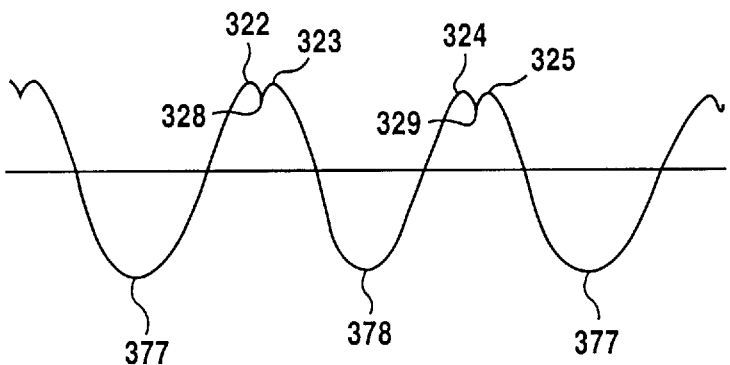
Figure 7:
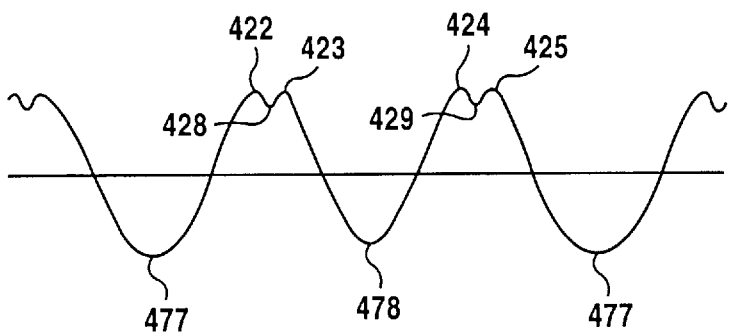

To either side of grooves 177 and 178 is a hump of metal 122 to 125 which has been plastically deformed from the groove area. FIGS. 5, 6 and 7 illustrate successive stages in the thread rolling operation as the grooves 177 and 178 are deepened and widened through their stages 277 and 278, to 377 and 378 and to 477 and 478. The skilled person will be able to follow the operations from the illustrations without further detailed description. As the grooves are deepened and widened, the humps show an increased size and increased displacement of position in successive stages, and in FIGS. 3 to 7 their identifying numerals have been changed only by the hundreds digit in order to identify them more easily.

Of particular relevance is that hump 122/222/322 and hump 123/223/323 converge to form a ridge, with its two peaks separated by the shallow trough 328, and that similarly hump 124/224/324 and hump 125/225/325 converge to form the other ridge with its two peaks separated by the shallow trough 329.

The final stage of the rolling operation is for the rolling dies to finish roll the crests, including down into the troughs 428 and 429, to more uniformly define the peaks 422 to 425 and the troughs 428 and 429 between the peaks.

Figure 8:
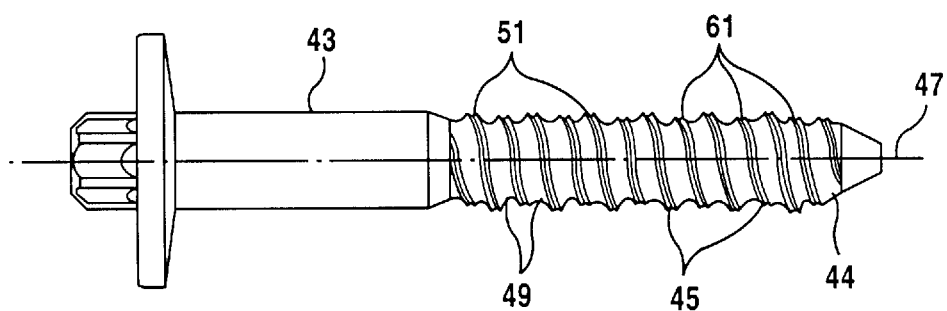
FIG. 8 is an illustration showing a rail fastening screw carrying a thread according to another embodiment of the invention.

Referring now to the embodiment in FIG. 8, this shows a rail fastening screw 43 similar to the screw in FIG. 1, the only significant difference being the thread configuration. The thread 45 of this screw 43, like the thread of the screw in FIG. 1, has a 5 mm pitch and 10 mm lead. Accordingly it is a twin start thread with two ridges 51 and 61 helically winding around a core 49. Ridge 51 is significantly higher than ridge 61 and both maintain their heights for the length of the thread, so the thread is continuous for its length on the screw. The dimensions of the screw are the same as those given above for the embodiment shown in FIG. 1, except that for the FIG. 8 embodiment, the pre-roll diameter for the thread 45 is somewhat smaller being approximately 12 mm. The crest of each ridge 51 and 61 carries a pair of peaks along its length and these will now be described with reference to FIG. 9.

Figure 9:
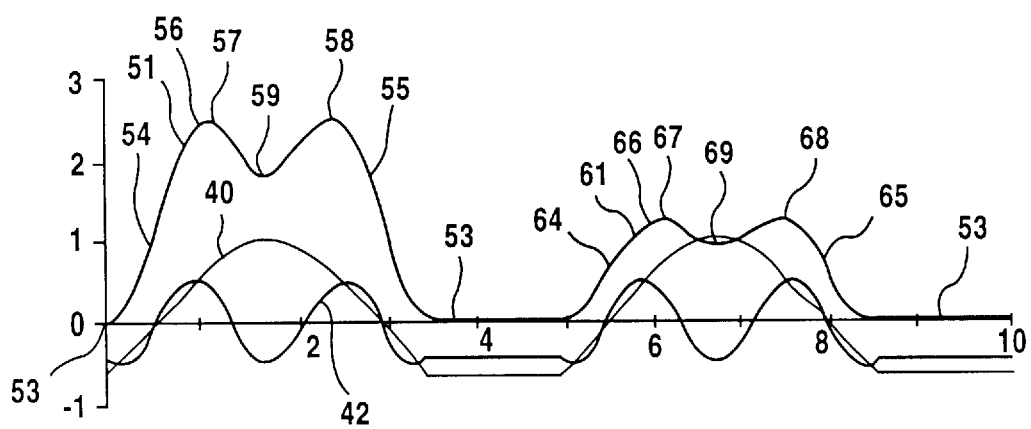
FIG. 9 is a diagram showing in detail a threadform similar to that formed on the screw shown FIG. 8.

The threadform shown in FIG. 9 is slightly different to that in FIG. 8. In particular, the root 53 in FIG. 9 is more squared off than the corresponding part of the threadform in FIG. 8. However this difference may be allowed for by the skilled reader.

With reference to FIG. 9, the threadform is indicated as the heavy line highest in the illustration. It should be noted that the cross section through the thread so illustrated is not parallel to the axis 47 of the screw, but is instead at the helix angle to the axis 47 in order to be at right angles to the line of the ridges 51 and 61. The threadform can be seen to consist of alternating high and low ridges 51 and 61 respectively separated by roots 53 where the thread rolling process has pressed most deeply into the metal of the shank 44. The distance of the roots 53 from the axis 47 defines the radius of the core 49 of the threaded shank 44.

Working from the left side of FIG. 9, the threadform profile rises from a root 53 to the ridge 51 by way of a flank 54 which rises to a crest 56. This crest carries two peaks 57 and 55 with a trough 59 between them. From peak 58 the ridge falls down a flank 55 to the root 53 which is of the same depth as the root on the other side of the ridge 51. The threadform profile then rises to the ridge 61 by way of a flank 64 which rises to a crest 66. The ridge 61 is significantly lower than the ridge 51. The crest 66 carries two peaks 67 and 68 with a trough 69 between them. From the peak 68 the ridge falls down a flank 65 to the root 53 from where the threadform repeats its sequence. The trough 69 has a shallower form than trough 59.

The scales on the axes of FIG. 9 indicate the dimensions in mm for the threadform. The higher ridge 51 rises 2.5 mm from the root while the lower ridge 61 rises 1.25 mm. The higher trough 59 is 0.7 mm deep while the lower trough 69 is 0.25 mm deep. The lower ridge is thus 50% of the height of the higher ridge, and thus within the preferred range of 30% to 70%. Also, the higher trough is 28% of the height of the higher ridge, while the lower trough is 20% of the height of the lower ridge, thus within the more preferred range of 15% to 35%.

The threadform profile may be defined such that it resembles a compound of sinusoidal wave forms. Two such curves are shown in the lower portion of FIG. 9.

Curve 40 illustrates the relationship:

$$f(t)=a_1 \sin \omega t \text{ for } 39° \leq t \leq 219°$$

Curve 42 illustrates the relationship:

$$f(t)=a_2 \sin 3\omega t \text{ for } 39° \leq t \leq 219°$$

Accordingly the threadform can be approximated by the compound relationship

| | |
|---|---|
| $f(t) = A(a_1 \sin\omega t + a_2 \sin 3\omega t + C)$ | for $39° \leq t \leq 219°$ and |
| $f(t) = 0$ | for $219° \leq t \leq 219° + \phi$ |
| | where $a_1 \geq a_2$ |

This relationship defines a single cycle of the threadform which is repeated along the threaded shank 44.

Alternatively the threadform can be approximated by defining as linear dimensions the height, width and separation of the ridges and defining their shape by a series of straight lines at set angles connected by radiused curves.

Figure 10:
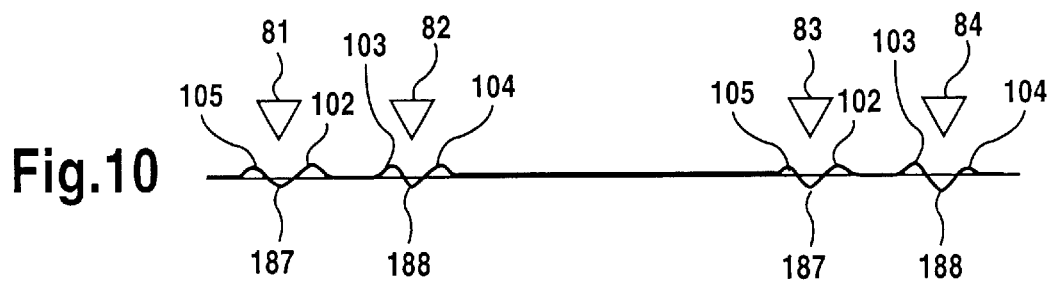
FIGS. 10 to 13 show diagrammatically steps in a thread rolling process which produces the threadform shown in FIG. 8.
Figure 11:
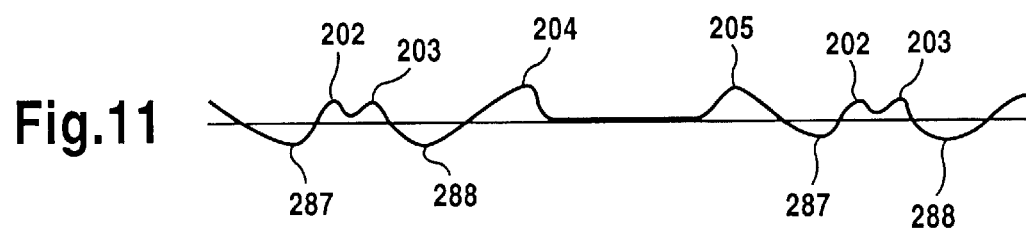
Figure 12:
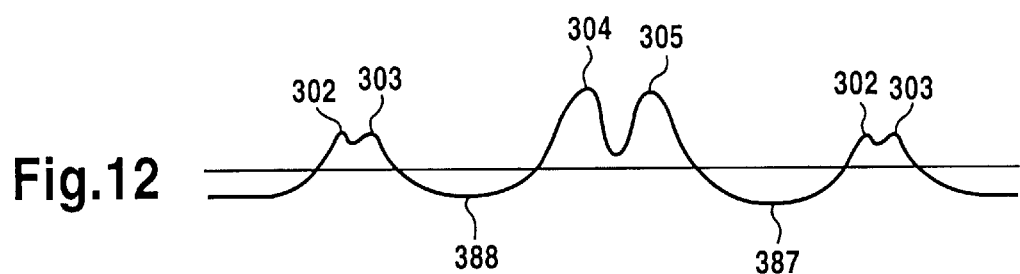
Figure 13:
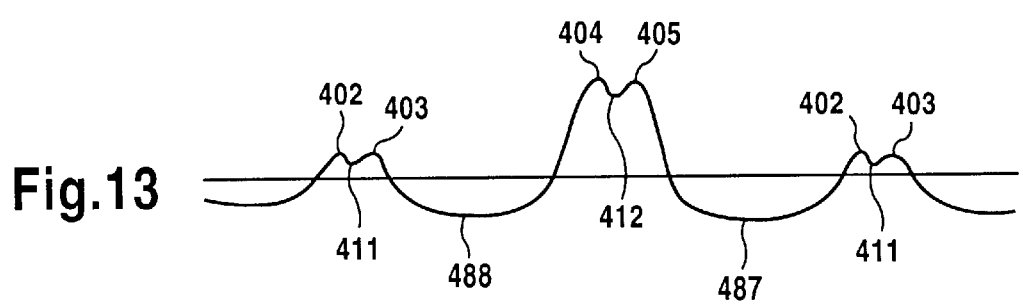

FIG. 10 illustrates diagrammatically the positioning for initial tips 81 to 84 to make contact upon a cylindrical workpiece by a die in a thread rolling operation where the intent is to produce a twin start thread with evenly spaced, unevenly sized ridges in the threadform in accordance with one embodiment of the present invention. When the tips 81 to 84 are rolled into the surface of the workpiece, two helical grooves 187 and 188 are produced. The thread rolling die is configured so that the groove 187 made by tip 81 is contiguous with the groove made by tip 83. In the same way the tips 82 and 84 together make groove 188. Grooves 187 and 188 are not evenly spaced along the workpiece. They are axially offset from each other by 90° or 25% of their lead.

To either side of grooves 187 and 188 are ridged humps of metal 102 to 105 which have been plastically deformed from the groove area. FIGS. 10 to 13 illustrate successive stages in the thread rolling operation as the grooves 187 and 188 are deepened and widened through their stages 287 and 288, to 387 and 388, and to 487 and 488. From the study of FIGS. 10 to 13 the skilled person will be able to follow the operations without further detailed verbal description. For the purposes of explaining the process, as the humps develop an increased size and increased displacement of position in successive stages, their respective identifying numerals in FIGS. 10 to 13 have been changed only by the hundreds digit in order to identify them more easily.

Of particular relevance is that hump 102/202,302,402 and hump 103/203,303/403 converge to form the low ridge, with its two peaks separated by the shallow trough 411, and that similarly hump 104/204/304/404 and hump 105/205/305/405 converge to form the high ridge with its two peaks separated by the shallow trough 412.

The final stage of the rolling operation is for the rolling dies to finish roll the crests, including down into the troughs 411 and 412, to more uniformly define the peaks 402 to 405 and the troughs between them.

The embodiment of the invention described with reference to FIGS. 10 to 13 involves the initial helical grooves 187 and 188 being axially offset from each other by 90° or 25% of their lead. The extent of offset chosen for other embodiments is greatly influenced by the intended difference in size wanted between the sizes of the final ridges. The size difference becomes significantly beneficial at an offset less than 45%, and even more so at less than 35% offset. But at less than 20% the amount of metal relocation required in the thread rolling process tends to become too high. A 20% offset corresponds to about 70° of lead, 35% to about 125° and 45% to about 160°.

Although the above descriptions with reference to FIGS. 3 to 7 and FIGS. 10 to 13 refer to stages of a thread rolling operation, such an operation need not be a series of separate steps. In fact the stages preferably form a continuous procedure by careful design of the thread rolling dies and this will be understood by the skilled worker.

RAMIFICATIONS AND CONCLUSION

While testing has confirmed screw fasteners incorporating the present threadform perform better than conventionally threaded fasteners of the same size, the full reasons are not completely understood. However a possible explanation for at least part of the advantage has been developed. While it is now offered in order to explain the physical effects at work in a screwed fastener's operation, it is not intended to limit the scope of the invention thereby.

Conventional threads for wood screws have crests which have a single sharp edge. It has previously been thought that this is advantageous because it cuts through the wood fibres and so achieves maximum penetration. Failure of the fastening system usually occurs by tearing of the timber as the screw pulls out, bringing with it a torn plug of timber the diameter of which is the same as the outside diameter of the thread. In contrast the present invention attempts to reduce the degree to which the wood fibres are cut. Instead, the penetration of the threadform into the adjacent timber is more by way of compressing the timber rather that cutting it. This leaves the wood fibres longer and more intact, thereby causing less weakening of the timber's structure. Also, because the timber is significantly compressed, the timber exhibits a higher strength. The process of compressing the timber instead of cutting into it is particularly prevalent at the crest 66 of the lower ridge 61 of the threadform shown in FIG. 9.

It will be appreciated that fasteners incorporating the threadform described above are not restricted to rail track applications. The characteristics which make them desirable for that purpose make them similarly useful for fastening to any timber item or to other similar types of dense fibrous or fibre reinforced materials. Particular applications are envisaged in landscaping and in fastening planks on piers and jetties for example. Fasteners incorporating the threadform may also be screwed into non fibred materials, such as plastic plugs inserted into spike killed timber sleepers, and may be installed in other applications where conventional screws would have otherwise been used.

Throughout this specification, unless the context requires otherwise, the word "comprise", and variations such as "comprises" and "comprising", will be understood to imply the inclusion of a stated integer or group of integers but not the exclusion of any other integer or group of integers.

Finally, it is to be understood that various alterations, modifications and/or additions may be introduced into the constructions and arrangements of parts previously described without departing from the spirit or ambit of the invention.

What is claimed is:

1. A screw thread having a twin start helical thread configuration consisting of two ridges helically winding around a shank, each of the ridges having flanks rising from a root to a crest, and at least one of the crests having a pair of peaks, where in one of the ridges is higher than the other ridge.

2. A screw thread according to claim 1 in which the crests of both of the helically wound ridges have a pair of peaks.

3. A screw thread according to claim 1 in which the lower ridge is between 30% and 70% of the height of the higher ridge.

4. A twin start screw thread for a fastener, the thread having a repeated threadform profile comprising:
   a first crest, having a first pair of peaks, rising from a first root and falling to a second root, and
   a second crest, having a second pair of peaks, rising from the second root and falling to the first root,
   wherein the first crest is higher than the second crest.

5. A screw thread according to claim 4 wherein the second crest is between 30% and 70% of the height of the first crest.

6. A railway track comprising:

a timber sleeper;

a rail fastened to the timber sleeper with a threaded fastener;

the fastener comprising a screw thread having a thread-form comprising two ridges rising from root to crest with at least one crest having two peaks separated by a trough the depth of which is less than the height of the ridge from root to crest, wherein one of the ridges is higher than the other ridge.

7. The railway track according to claim 6, wherein the fastener further comprises a head for applying torque to the fastener and a collar integrally formed with the head, the collar having a sloping face facing the tread, said slope matching the slope of an upper surface of a foot of the rail.

8. The railway track according to claim 6 wherein the trough depth is between 10% and 40% of the height of the ridge.

9. The railway track according to claim 8 wherein the trough depth is between 15% and 35% of the height of the ridge.

10. A method of rolling a helical screw thread onto a cylindrical shank of a metal workpiece comprising:

rolling into the shank initial helical grooves by plastically deforming the metal into a hump immediately to either side of the grooves, subsequently deepening and widening the initial grooves by further rolling which increases the size of the humps and displaces the humps increasingly further from the initial grooves, further deepening and/or widening the grooves to press the two humps between adjacent grooves into each other until they produce a single ridge with a crest carrying a pair of peaks, and finish rolling the crest to more uniformly define the two peaks along the crest of the ridge.

11. A method of rolling a helical screw thread onto a cylindrical shank of a metal workpiece comprising:

rolling into the shank initial helical grooves by plastically deforming the metal into a hump immediately to either side of the grooves, subsequently deepening and widening the initial grooves by further rolling which increases the size of the humps and displaces the humps increasingly further from the initial grooves, further deepening and/or widening the grooves to press the two humps between adjacent grooves into each other until they produce a single ridge with a crest carrying a pair of peaks, and finish rolling the crest to more uniformly define the two peaks along the crest of the ridge, wherein the height of each side pair of peaks, when measured from the bottom of a through between each pair, is between 10% and 40% of the height of their respective ridge.

12. A method according to claim 11 wherein the height of each said pair of peaks when measured from the bottom of a trough between each pair, is between 15% and 35% of the height of their respective ridge.

13. A method according to claim 11 wherein:

the screw thread has a twin start with two said initial helical grooves axially offset from each other by less than 45% (160°) of their lead, the finished thread has the helical crests of the ridges offset by substantially 50% (180°) of their lead, and as one helical groove is displaced axially relative to the other helical groove during the rolling process, one helical ridge is produced which is taller than the other.

14. A method according to claim 13 wherein the axial offset of the two initial helical grooves is between 20% (70°) and 35% (125°) of the thread lead.

* * * * *